May 5, 1970           F. P. BENNETT           3,510,215
RANDOM ACCESS MEANS FOR SLIDE PROJECTORS
Filed Oct. 2, 1967           8 Sheets-Sheet 4
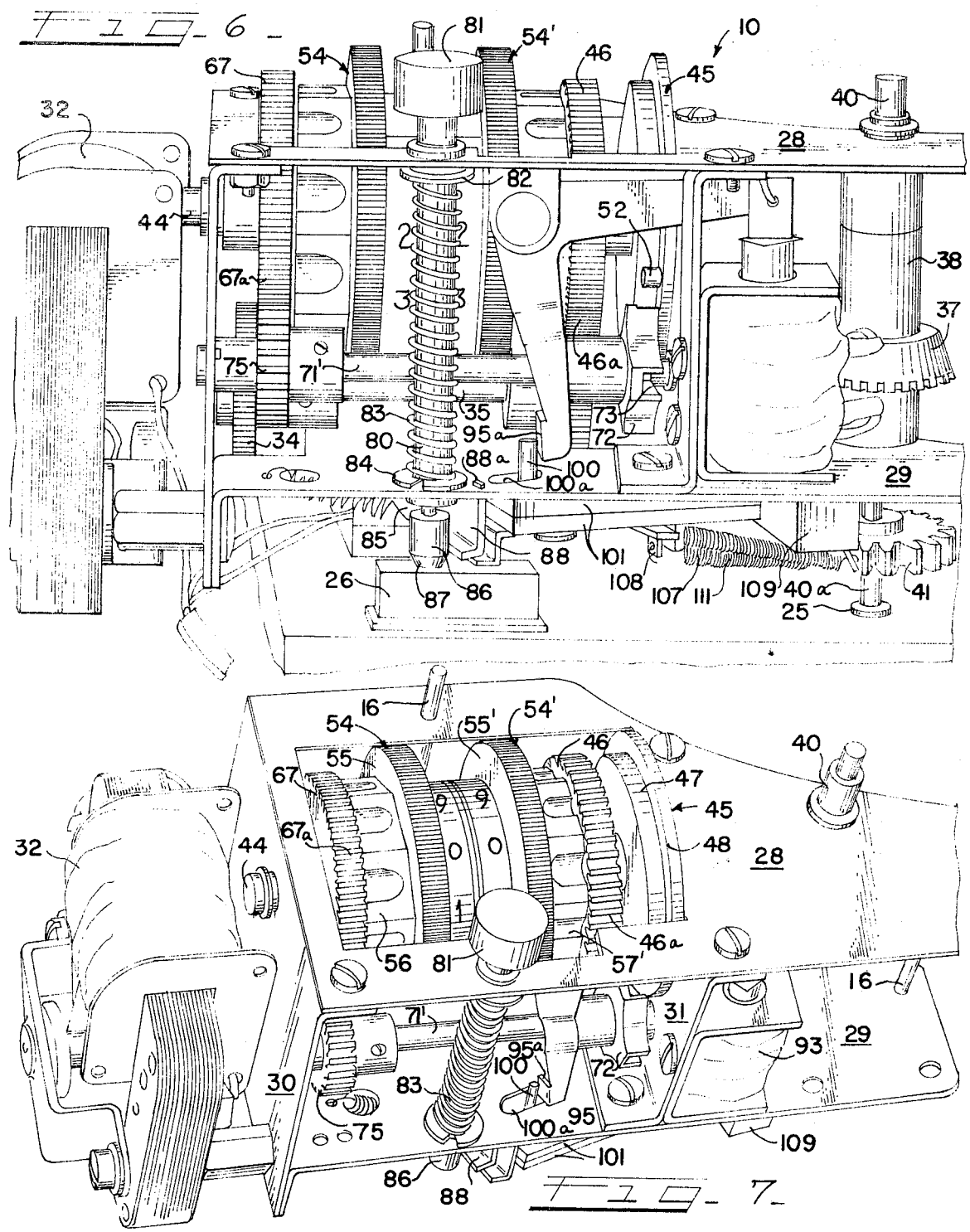
INVENTOR
FRANK P. BENNETT INVENTOR
FRANK P. BENNETT
BY Dreist, Lockwood, Greenawalt
& Dewey
ATT'YS.

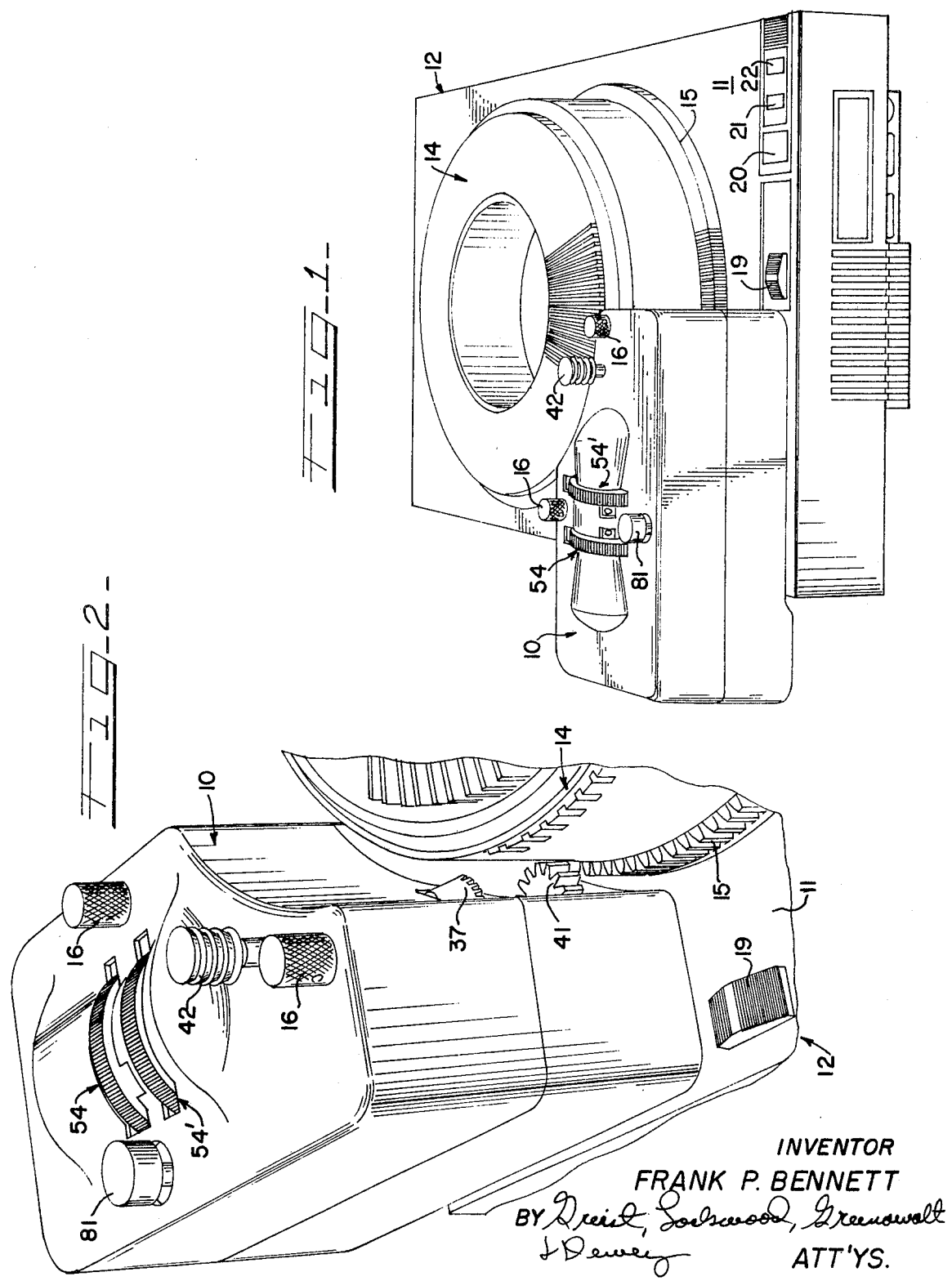

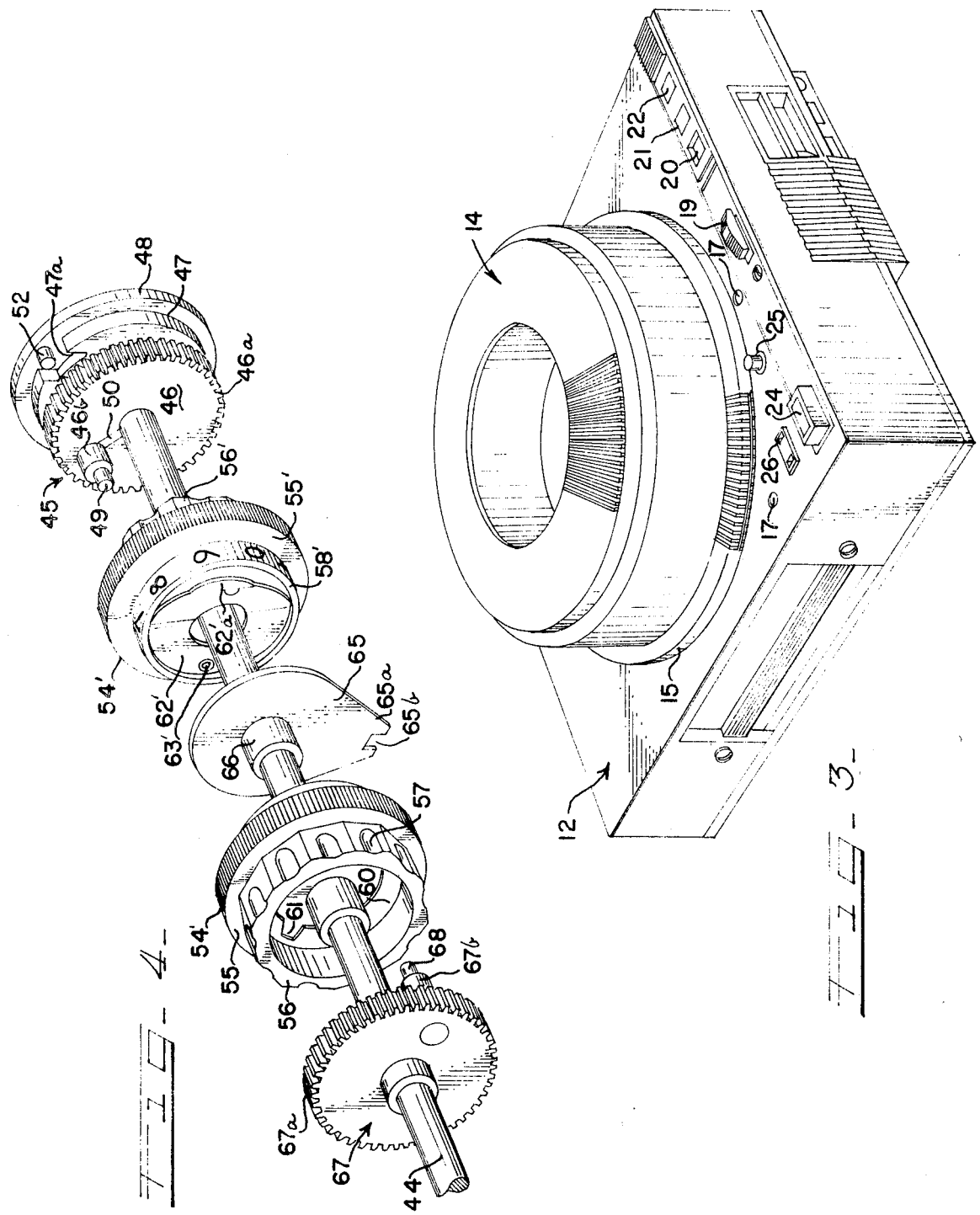

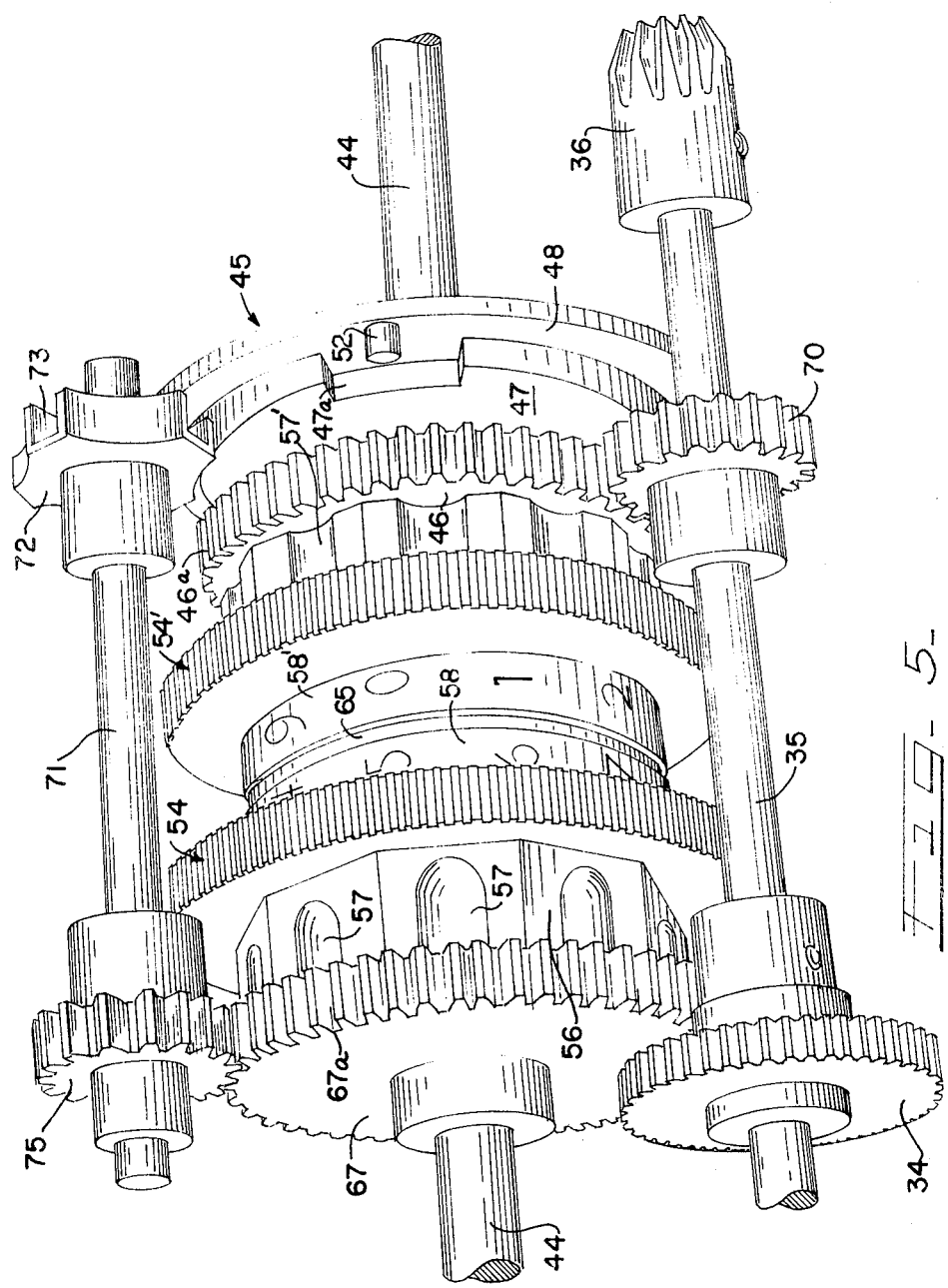

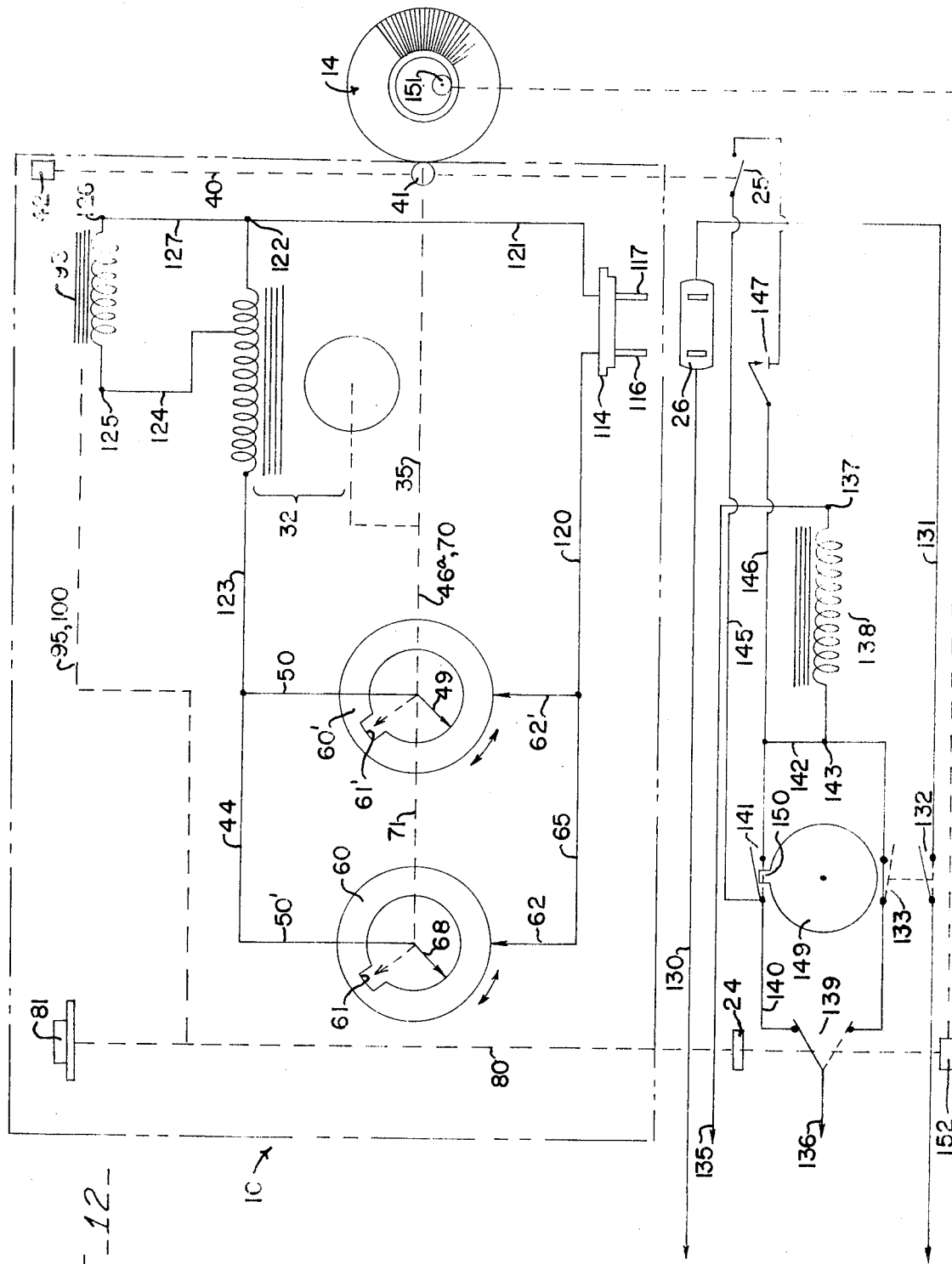

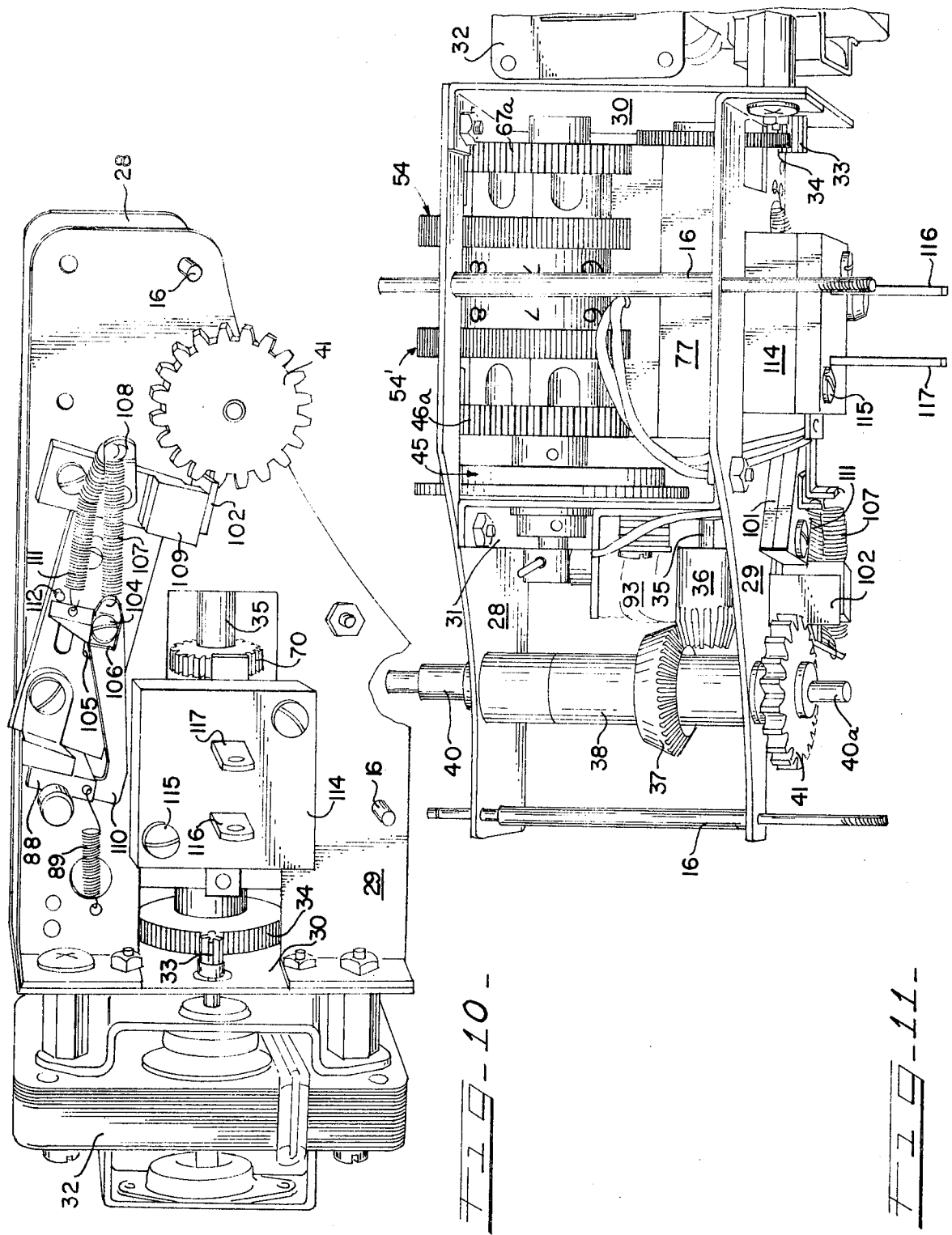

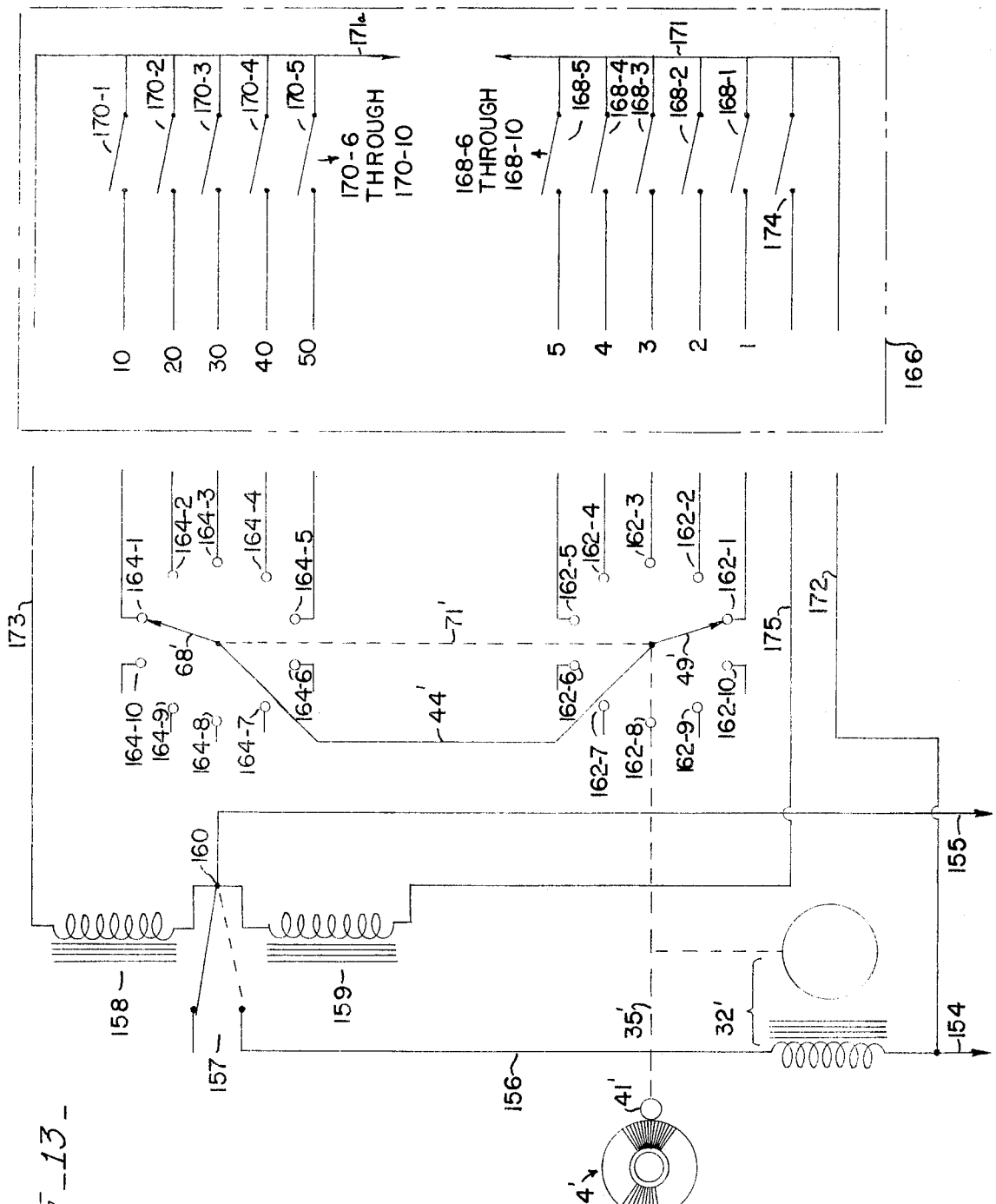

United States Patent Office 3,510,215
Patented May 5, 1970

3,510,215
RANDOM ACCESS MEANS FOR SLIDE
PROJECTORS
Frank P. Bennett, Northbrook, Ill., assignor to GAF
Corporation, a corporation of Delaware
Filed Oct. 2, 1967, Ser. No. 672,214
Int. Cl. G03b 23/02
U.S. Cl. 353—25      14 Claims

ABSTRACT OF THE DISCLOSURE

The random access accessory is detachably mounted on the top of a slide projector and includes its own motor and drive gear, which gear meshes with the teeth on the tray. The attachment further includes a pair of manually operable selector wheels, each bearing numerals "0" through "9" for selecting any space in the 100 space tray. Each of these wheels carries an arcuate commutator strip having a cutout area. A pair of brushes are carried respectively on a second pair of wheels and mounted such that the brushes are in wiping or sweeping engagement with respective commutator strips. Manual rotation of the first pair of wheels, i.e., the selector wheels, positions the commutator cutouts relative to the brushes. The brushes and commutator strips are in a circuit which is opened when both brushes lie in respective cutout areas; thereby stopping the tray with the selected slide space at the slide transfer station.

In an alternative embodiment, individual contacts arranged in circular patterns are substituted for the commutator strips. A plurality of push-button operated switches allow the operator to place a selected contact in each pattern of contacts in the circuit.

OBJECTS OF THE INVENTION

A primary object of the present invention is the provision of new and improved slide projector random access means of simplified construction.

Another object of the invention is to provide, for a slide projector, random access means in the form of a simplified accessory attachment which is detachably mountable on the projector and requires minimal modifications in the latter to accept the attachment.

Still another object of the present invention is the provision of random access means including a first pair of contacts each arranged in a circular pattern, a second pair of contacts associated respectively with the first pair of contacts thereby defining "units" and "tens" selector means, unique drive means for causing differential relative movement between the pairs of contacts, such drive means being driven by the same power source which rotates the tray.

Another object of the invention is the provision of random access means for a slide projector including a first pair of wheels each carrying an arcuate commutator strip having a cutout area, a second pair of wheels each carrying a brush, means mounting all of the wheels with the brushes in respective wiping or sweeping engagement with the commutator strips, drive means for rotating one of the pairs of wheels at a 10:1 ratio with each other, and selector means associated with the other pair of wheels for establishing the initial arcuate spacing between the brushes and respective commutator cutout areas.

These and other objects and advantages of the invention will become apparent from the following specification disclosing a preferred embodiment illustrated in the accompanying drawings.

DESCRIPTION OF THE DRAWINGS

FIG. 1 is a perspective view of the random access means of this invention in the form of an attachment mounted on a slide projector;

FIG. 2 is a perspective view of the random access attachment and the slide projector of FIG. 1 with the drive gear of the attachment shown disengaged from the teeth on the rotary slide tray;

FIG. 3 is a perspective view of the slide projector with the random access attachment removed;

FIG. 4 is an exploded perspective view of certain of the components within the random access attachment;

FIG. 5 is a perspective view primarily showing the components of FIG. 4 in their assembled relation and associated with drive means therefor;

FIG. 6 is a perspective view of the random access attachment mounted on the slide projector, with the housing of the attachment being removed for illustration of the various components therein;

FIGS. 7 through 11 are perspective views of the random access attachment with the cover or housing thereof removed for the purpose of illustrating the various components;

FIG. 12 is an electrical schematic of the random access attachment and also showing the associated circuitry in the projector; and FIG. 13 is an electrical schematic of an alternative embodiment.

DESCRIPTION OF A PREFERRED EMBODIMENT

Figure 8:
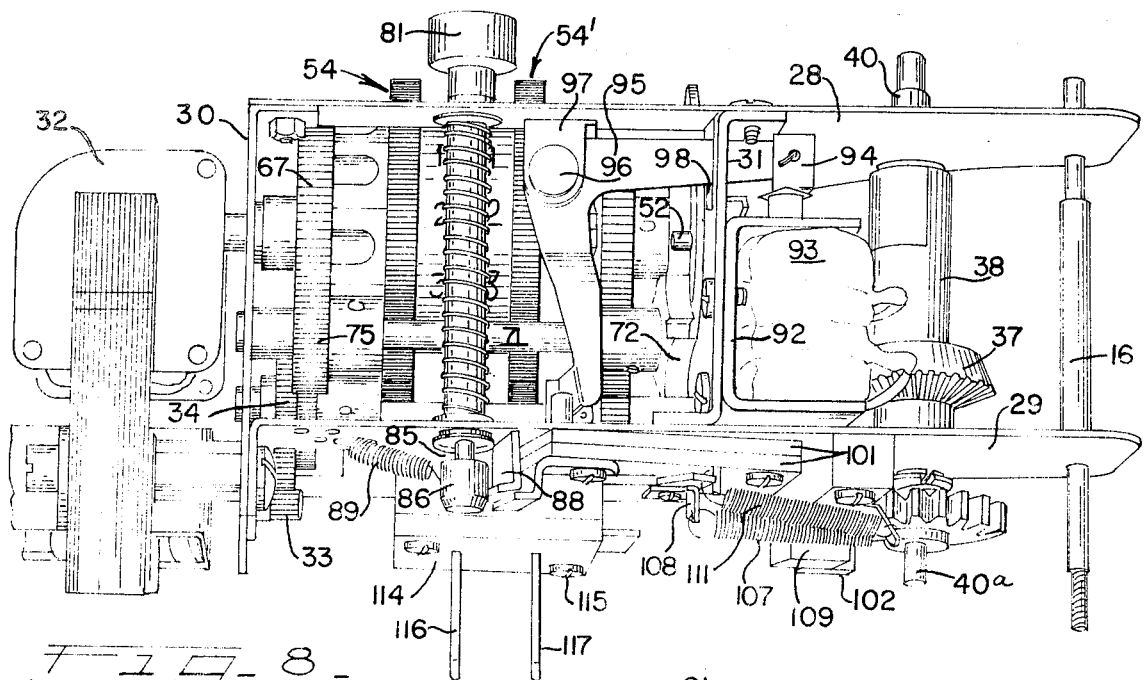

Referring primarily to FIGS. 1, 2 and 3, according to a preferred embodiment of the invention, the random access means are incorporated in an accessory attachment 10 detachably mounted on the shell 11 of a slide projector 12. This projector, which may be of the type disclosed and claimed in the application of Walter J. Hall, Ser. No. 554,071, filed May 31, 1966, includes a rotary slide tray 14 having radially arranged partitions for defining a plurality of numbered slide receiving spaces, say 100 for example. The slide projector 12 of course includes a slide transfer station (not shown) containing suitable means for receiving slides one at a time from the magazine, projecting such slides and returning the same to their spaces in the slide tray. The tray 14 includes an external formation of indexing teeth 15. The attachment 10 is detachably mounted on the projector by any convenient means, such as a pair of elongated fasteners 16 the lower ends of which are threadingly received in apertures 17 in the projector.

The projector includes suitable controls 19, 20, 21 and 22 for operating the projector independently of the random access attachment. It will be understood the projector 12 includes slide changing and slide indexing mechanism for projecting slides in the tray 14 in sequence. The projector also incldues a load button 24 and a defeat switch 25; the purpose and operation of these two elements will be explained hereinbelow. Finally, the projector includes a socket 26 for placing the circuitry in the random access attachment 10 in electrical communication with the electrical power system and circuit within the projector.

Figure 9:
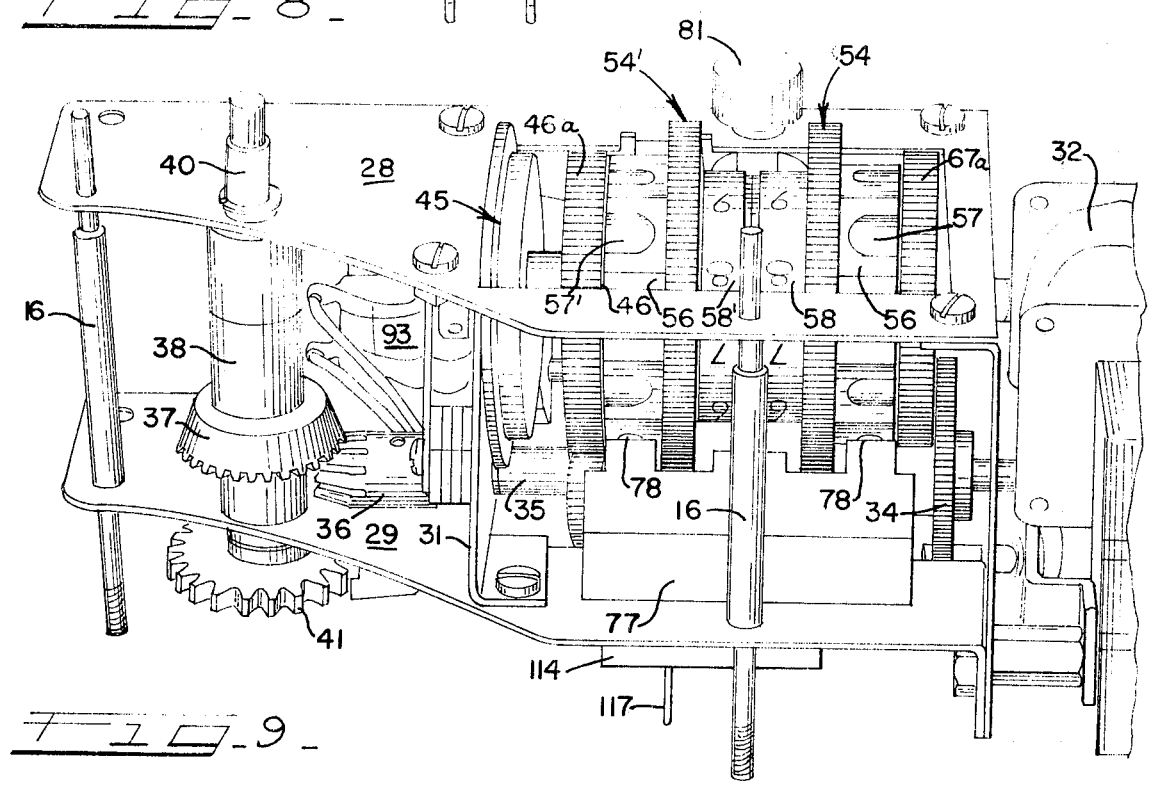

Referring primarily to FIGS. 6 through 11, the random access attachment 10 contains an internal framework consisting primarily of top and bottom plates 28 and 29, respectively, an end plate 30 and an intermediate wall plate 31, all secured together by fasteners. End plate 30 mounts a small electric motor 32 having a drive gear 33 which meshes with a larger gear 34 secured on a drive shaft 35. The drive shaft 35, which is suitably journaled in the end plate 30 and intermediate wall plate 31, carries a bevel gear 36 on the end thereof opposite the end mounting the gear 34. Gear 36 is in constant meshing engagement with a gear 37 mounted on a vertical shaft 38, the latter being journaled adjacent its respective opposite ends in the frame plates 28 and 29. Mounted within the shaft 38 for rotation therewith, as by a spline connection, is a subshaft 40 mounting a drive gear 41 on the lower end thereof. It will be understood the shaft 40 is mounted for limited axial movement relative to the shaft 38. A knob 42 (FIG. 2) is secured to the upper end of the subshaft 40 thereby facilitating manual lowering and raising of the same for respective engagement and disengagement of the gear 41 with the teeth 15 on the slide tray 14. It will be understood that the motor 32 serves to drive gear 41 for rotating the slide tray when the gear 41 is engaged with the teeth 15.

Subshaft 40 includes an extension 40a which projects downwardly beneath gear 41 for engagement with the defeat switch 25. When the shaft 40 is depressed to bring the gear 41 into engagement with the teeth 15, the extension 40a depresses the defeat switch 25 for opening the same.

A shaft 44 is fixedly mounted in parallel spaced relation with the drive shaft 35; opposite ends of the former are connected to end plate 30 and the intermediate plate 31. Turning now primarily to FIGS. 4 and 5, a first wheel, generally designated 45, is rotatably mounted on shaft 44 adjacent the intermediate wall plate 31. Wheel 45 includes integral, concentric portions 46, 47 and 48 progressively larger in diameter. Portion 46 includes a peripheral formation of gear teeth 46a and an integral cylindrical portion 46b which extends in parallel spaced relation with the shaft 44. Portion 46b includes a bore containing a spring (not shown) for yieldably mounting a carbon brush in the form of a pin 49. At this time it should be mentioned that wheel 45 is preferably formed of dielectric material. The brush 49 is placed in conductive relation with the metal shaft 44 by a radially extending strip 50. Portion 47 includes a notch 47a to accommodate a pin 52 carried by the portion 48 and forming part of a Geneva drive.

Also rotatably mounted on the shaft 44 is a pair of selector or control wheels 54, 54'. These wheels are of identical construction and are mounted on the shaft in opposite hand relation with each other. The same reference characters are used to identify corresponding portions of both of these wheels; the two wheels being distinguished by using the prime form of numeral. Each selector wheel includes a central disk portion 55 having axial grooves around its periphery to facilitate manual rotation. Integral with one side of the portion 55 is a generally cylindrical portion 56 having a decagonal outer surface forming ten detent pockets 57. A cylindrical portion 58 is integral with the other face of the central portion 55; the portion 58 bears indicia from "0" to "9."

Mounted within the cylindrical portion 56 is a generally annular or arcuate commutator strip 60 having a cutout area 61. The body of the selector wheel 54 is formed of dielectric material; therefore, the commutator strip 60 is in non-conductive relation with the metal shaft 44. A metallic ring 62 is mounted within cylindrical portion 58 in such manner that it does not come into contact with the shaft 44. A rivet 63 places the commutator strip 60 in conductive relation with the ring 62. The ring 62 has the portion 62a thereof diametrically opposite the rivet 63 bent inwardly for wiping engagement with a metal plate 65 mounted on the shaft 44 in non-conductive relation therewith as by means of a dielectric collar 66. The plate 65 includes an extension 65a having a notch 65b to facilitate connection with one end of a connector wire.

Also mounted on the shaft 44 is another wheel 67 identical with the portion 46 of the wheel 45. Wheel 67, preferably made of dielectric material, includes a peripheral formation of teeth 67a. This wheel has an integral cylindrical extension 67b yieldably mounting a carbon brush 68. A strip 50' (shown only schematically in FIG. 12) identical to the strip 50 maintains the brush 68 in conductive relation with the shaft 44.

Looking now to FIG. 5, it will be understood that when all of the wheels are assembled in their operative relationship on the shaft 44, the plate portions 62a and 62a' are in wiping engagement with the opposite faces of the plate 65 and brushes 49 and 68 are in respective wiping or sweeping engagement with commutator strips 60 and 60'. The drive shaft 35 carries a pinion gear 70 which meshes with gear teeth 46a; therefore, wheel 45 is directly driven from shaft 35. A third shaft 71 has its opposite ends suitably journaled in frame plates 30 and 31. Shaft 41 carries a maltese cross member 72 having four slots 73 arranged at 90° with each other for one-at-a-time reception of the pin 52. By this arrangement, the shaft 71 is of course intermittently rotated. The other end of the shaft 71 mounts a gear 75 in meshing engagement with gear teeth 67a. It will be understood that by reason of the Geneva drive and the relationship between the diameters of gear 75 and the wheel 67, the latter makes one revolution for every ten revolutions of the wheel 45. Looking to FIG. 9, a block 77 mounted on frame plate 29 yieldably mounts a pair of detent balls 78, 78' which enter the pockets 57, 57' to facilitate angular positioning of the selector wheels 54, 54'.

Frame plates 28 and 29 have aligned apertures receiving a vertically disposed rod 80 mounting an "initiate" button 81 on the upper end thereof. A collar 82 is fixed to the rod 80 adjacent the upper end thereof. A coil spring 83 encircles the rod 80 with one end of the spring abutting the underside of the collar 82 and the other end of the spring abutting a bushing 84 secured in an aperture in the frame plate 29. This spring acts to urge the initiate button (and the rod 80) to the upper position illustrated in FIG. 6, for example. The rod 80 has an annular groove 85 defining a lowermost cylindrical portion 86 which joins with an inverted, frusto-conical portion 87.

A catch 88 in the form of a small plate bent at a right angle has a pair of upwardly extending projections (one projection 88a is shown in FIG. 6) for swingably mounting the catch from the frame plate 29. A coil spring 89, best seen in FIGS. 8 and 10, has one end thereof connected to the catch 88 and the other end thereof suitably secured to the frame plate 29. This spring urges the catch plate into engagement with the lowermost portions 86, 87 of the rod 80. When the rod is lowered, as by manually depressing the button 81, the catch 88 snaps into the annular groove 85 and thereby holds the rod 80 in its lower position. It will be understood that when the rod 80 is lowered by depressing the initiate button 81, the projector load button 24 is depressed; this can be seen from FIG. 6.

Intermediate wall plate 31 mounts a generally U-shaped bracket 92; such bracket mounts a solenoid 93 having an upwardly extending plunger or movable member 94. The plunger 94 is pivotally connected to one end of a right arm member 95 which is pivotally mounted intermediate its ends on a pin 96 carried by a bracket 97, the latter being secured to the underside of frame plate 28. The wall plate 31 includes a slot 98 to accommodate movement of the arm 95. The end of the arm remote from the solenoid plunger includes an integral ear 95a which engages a pin 100 fastened to a slide bar (not shown)

mounted for reciprocal sliding movement in a slideway (also not shown) formed in the block members 101, which members are secured to the underside of the frame plate 29. A slot 100a is formed in the plate 29 to allow movement of the pin 100.

Referring to FIG. 10, the slide bar just mentioned carries a locking plate 102 for locking engagement with the teeth of drive gear 41. This slide bar also carries a fastener 104 which is received within a slot 105 formed in the lowermost block 101. Fastener 104 mounts a bracket 106 which is connected to one end of a spring 107. The other end of the spring is connected to a bracket 108 mounted on a block 109, the latter being secured to the underside of the frame plate 29. It should be apparent the spring 107 acts to urge the plate 102 into locking engagement with the teeth of the drive gear 41.

Fastener 104 pivotally mounts a generally right angle arm member 110. One end of this arm is connected to one end of a spring 111, the other end of this spring being connected to the bracket 108. Therefore, the spring 111 tends to urge the arm 110 clockwise with respect to the fastener 104 as viewed in FIG. 10. A stop 112, fixedly mounted from the lowermost block 101, limits such clockwise movement of the arm 110. The other end of the arm 110 is in the form of a hook for engaging the catch 88.

Assume for the moment that the initiate button has been depressed and that the catch 88 is received within annular recess 85. When the solenoid 93 is energized, the ear 95a engages the pin 100 withdrawing the locking plate 102 from the teeth of gear 41 and simultaneously moving the arm 110 such that the hook portion thereof swings around and in front of the catch 88. When the solenoid 93 is de-energized, springs 107, 111 act to insert the locking plate 102 into locking engagement with the teeth on gear 41 and at the same time cause the hook-on member 110 to engage the catch 88 and swing the same free from the annular recess in the rod 80, thereby allowing the latter to move upwardly under the influence of the spring 83. During the final portion of this movement of the arm 110, the latter will pivot around fastener 104 (after disengaging the catch 80) so as to be clear of the catch 88, which will now be in abutting engagement with cylindrical portion 86 of the pin, being urged against such portion by reason of the spring 89. In other words, the catch is now free of the hook to be snapped into the annular recess 85 upon depressing the initiate button 81.

A dielectric block 114 is mounted to the underside of the frame plate 29 by fasteners 115; this block supports blades 116, 117 which are received within the socket 26 when the random access attachment is mounted on the shell of the projector 12.

FIG. 12 is an electrical schematic of the random access attachment 10 and includes reference characters indicating the main mechanical movement elements described above. It will be noted that blade 116 is connected to plate 65 by a line 120. Blade 117 is connected by line 121 to one terminal 122 of the motor 32; the other terminal of the motor is connected directly to the shaft 44 by a line 123. The windings of the motor 32 are tapped by a line 124 which extends to one terminal 125 of the solenoid 93; the other terminal 126 of the solenoid is connected to motor terminal 122 by a line 127.

One contact in the socket 26 of the projector is connected to one of the line connectors 130, and the other contact in the socket is connected to the other line connector 131. A switch 132 is interposed in the line 131, which switch is mechanically connected to a one-half cycle switch 133 such that the former and the latter are always in opposite conditions, i.e., when one is open the other is closed, and vice versa. Switch 133 is constructed so as to be normally closed.

A transformer (not shown) in the projector provides 28 volt current at lines 135, 136. Line 135 is connected directly to one terminal 137 of a clutch solenoid 138. It will be understood this solenoid actuates a clutch which drives the projector slide changing and indexing mechanism. Line 136 is connected to a switch 139 which is normallly in the position illustrated in solid lines but which is moved to the broken line position when the load button 24 is depressed. One contact of the switch 139 is connected by a line 140 to one contact of a normally closed switch 141. The other contact of this switch is connected by a line 142 to terminal 143 of the solenoid 138, this terminal also being connected to one contact of the switch 133. Switch 141 is shunted by lines 145, 146 which are connected to the defeat switch 125. A normally open, momentary, projector-cycle switch 147 is interposed in the line 146; this switch is used to initiate a cycle of operation when the random access attachment is not being used.

The projector 12 includes a motor driven cam 149 having a single lobe 150. Each time the solenoid 138 is energized, the cam 149 rotates through a half cycle (180°) for alternately opening the switches 133, 141.

The projector includes an integral indexing or slide tray advance mechanism for rotating the tray in the normal manner, i.e., for projecting successive slides in the tray 14. This indexing mechanism includes an indexing gear 151 which meshes with another formation of teeth (not shown) on the inner wall of the tray. A disabling mechanism 152 is mechanically associated with the drive means for the gear 151. It will be understood that when the initiate button 81 is depressed for depressing the load button 24, the disabling means 152 are actuated for disabling or disengaging the drive to the gear 151. For a more detailed explanation of the slide projector 12 itself, reference should be made to the aforementioned Hall application.

The operation of the random access attachment 10 with the projector 12 is as follows: Assume these conditions exist: the attachment 10 is mounted in place on the projector with blades 116 and 117 received in the socket 26; the knob 42 is depressed for placing the drive gear 41 into engagement with the teeth 15 and for opening the defeat switch 25; a slide is in the projection gate, which slide has been selected by the random access attachment, in which case the brushes 68 and 49 will be in their broken line positions, i.e., in cutout areas 61 and 61', therefore, the motor 32 and solenoid 33 will be de-energized, and the initiate button 81 will have been allowed to pop up; the load button 24 will be up, thereby placing switch 139 in the solid line position shown, and the disabling means 152 will not be actuated to disengage the normal indexing drive gear 151; the cam 149 is in the position illustrated, as well as the switches 132, 133 and 141.

Assume further that the next slide space selected at random by the operator is such that both selector wheels 54, 54' are moved. This slide is selected by manually rotating wheels 54, 54' until the number of the selected slide space appears in the two windows in the attachment housing as illustrated in FIG. 1. This of course will have the effect of rotating the commutator strips 60, 60' such that they will come into contact with respective brushes 68 and 49. However, current will not flow to the motor 32 at this time since the switch 132 is in the open position. The operator now depresses the initiate button 181 which lowers the load button 24, actuating switch 139 to the broken line position shown, and actuating the disabling means 152 to disengage the normal drive gear 151. Current will now flow through the switch 133 to the solenoid 138 which will cause the cam 149 to go through a half cycle. As soon as the cam 149 commences movement, the lobe 150 will separate from the switch 141 allowing the same to close. As the cam 149 reaches the end of its half uycle of travel (during this half cycle the slide in the projection gate is returned to its space in the tray), the lobe 150 will open the switch 133 and simultaneously close the switch 132. Opening of the switch 133 will de-energize the solenoid 138 (stopping the cam 149) and closing of the switch 132 will supply power to the random access attachment 10, thereby energizing the motor 32 and solenoid 93.

Energizing the motor 32 applies power to the drive gear 41 for rotating the tray. The gear 41 is unlocked since the solenoid 93 is energized. Energization of this motor also causes the brush 49 to be rotated at a 10:1 ratio with the brush 68. Therefore, the selector wheel 54' is actually the "units" selector or control means, whereas the selector wheel 54 is the "tens" selector or control means.

The brushes 49, 68 sweep the associated commutator strips as the tray 14 is rotated by the gear 41. It will be appreciated that the circuit to the motor 32 will not be opened until both of the brushes 49, 68 lie in respective commutator cutout areas. By reason of the arrangement of the various parts, when this occurs the selected slide space will be located at the slide transfer station of the slide projector 12. When the circuit is opened the motor 32 is de-energized and the drive to the gear 41 discontinued for stopping the tray. A suitable brake (not shown) is provided to insure stopping of the tray 14 with the slide in the selected space disposed in proper alignment with the slide changing mechanism.

De-energizing of the motor 32 causes de-energizing of the solenoid 93. As explained above, this causes the catch 88 to be withdrawn thereby allowing the initiate button 81 to pop up. When this occurs, load button 24 is also allowed to lift thereby returning the switch 139 to the solid line position and also allowing the disabling means 152 to connect the normal indexing drive means with the gear 151.

De-energizing of the solenoid 93 also allows the locking plate 102 to engage the gear 41 for locking the tray with the selected space therein at the slide transfer station. The normal indexing mechanism including the gear 151 cannot be placed into operation (which would result in jamming since the gear 41 is locked in engagement with the tray teeth 15) since the defeat switch 25 is open.

When the switch 139 returns to the solid line position shown, power is supplied to the solenoid 138 through the closed switch 141. Energizing of the solenoid 138 causes the cam 149 to move through another half cycle. This will allow the switch 133 to close in turn opening the switch 132. During this one half cycle of the cam 149, the slide changing mechanism in the projector will lower the selected slide to the projection gate. As the cam 149 reaches the end of this half cycle, the lobe 150 will again open the switch 141 for de-energizing the solenoid 138. Another selection can now be made by the random access attachment 10 for another cycle of operation as just explained.

ALTERNATIVE EMBODIMENT

Referring to FIG. 13, the alternative embodiment is generally the same in principle and operation as the embodiment just described but differs mainly in the following two respects: (1) the preferred embodiment just described operates on an open circuit principle, whereas the alternative embodiment operates on a closed circuit principle; (2) the amount of tray movement in the FIGS. 1 through 12 embodiment is determined by manually rotating the selector wheels 54, 54' for positioning the commutator cutout areas relative to the movable brushes, whereas in the alternative embodiment individual contacts arranged in circular patterns are substituted for the commutator strips, such contacts being connected with individual push button actuated switches for placing selected contacts in the circuit.

In FIG. 13, the various mechanical parts which correspond to the mechanical parts of the FIGS. 1 through 12 embodiment are indicated by the prime form of numeral. Conductors 154, 155 supply line current to the projector, the line 154 being connected directly to motor 32'. A line 156 connects the motor to one contact of a switch 157, which switch is actuated for alternate movement between the solid and broken line positions shown by solenoids 158 and 159, respectively. Line 155 extends to a terminal 160 which is connected to both solenoids as well as the movable element of the switch 157.

The "units" control or selector means are defined by ten contacts 162–1 through 162–10 arranged in a circular pattern for being swept by the brush 49'. The "tens" control or selector means are defined by ten individual contacts 164–1 through 164–10 arranged in a circular pattern for being swept by the brush 68'.

The alternative embodiment preferably employs a remote control hand piece represented by phantom line 166, although it will be understood the various components within the remote control hand piece could be mounted on the slide projector itself as an integral part thereof.

The remote control hand piece 166 includes ten push buttons (not shown) bearing the indicia "1" through "9" and "0" and arranged for actuating switches 168–1 through 168–10, respectively. Only switches 168–1 through 168–5 are illustrated, it being understood of course that an additional five switches and lines are provided. Switches 168–1 through 168–10 are connected by lines to respective switch contacts 162–1 through 162.10.

The remote control hand piece includes another series of ten push buttons bearing indicia "1" through "9" and "0" for actuating respective switches 170–1 through 170–10. Only switches 170–1 through 170–5 are shown, it being understood that five additional switches and lines are provided such that switches 170–1 through 170–10 are connected to contacts 164–1 through 164–10, respectively. A common line 171 is connected to all of the "units" switches as indicated; this line is connected to a line 172 when the hand piece is connected to the projector. In like manner, a common line 171a connects all of the "tens" switches to a line 173. It will be noted that the hand piece includes an additional switch 174; this switch is mechanicallly connected to all "unit" switches 168–1 through 168–10 so as to be closed when any unit switch is closed. The switch 174 is connected to a line 175 when the hand piece is connected with the projector. Line 175 extends to one end of solenoid 159.

It will be apparent from FIG. 13 that slide space "11" was the last space selected. Assume it is now desired to project the slide in space "22." The two push buttons bearing indicia "2" are depressed which results in closing switches 170–2 and 168–2. Switch 174 is also closed since it is mechanically connected to all of the unit switches including switch 168–2. Closing of switch 174 results in energizing relay 159 through the circuit: 154, 172, 174, 175, 159 and 155. This will move switch 157 to the broken line position for supplying current to the motor 32' through the circuit: 155, 157, 156 and 154.

The tray 14' will now be rotated by the drive gear 41'. At the same time, the brushes 49' and 68' will be rotated at a 10:1 ratio by the mechanical mechanism including the Geneva drive explained above. When brushes 49' and 68' are in simultaneous engagement with contacts 162–2 and 164–2 relay 158 will be energized by the following circuit: 154, 172, 171, switch 168–2, contact 162–2, 49', 44', 68', contact 164–2, switch 170–2, 171a, 173, 158 and 155. Energizing solenoid 158 positions the switch 157 to the solid line position shown thereby to de-energize the motor 32' and stop the tray with the selected space at the slide transfer station, such space of course corresponding in number to the number established by the depressed push buttons.

Another selection can now be made. It will be understood of course that the "units" push buttons and the "tens" push buttons are mechanically connected so that only one push button in each set of push buttons may be depressed at any one time, or in other words, only one of the switches 168–1 through 168–10 and one of the switches 170–1 through 170–10 may be closed at any one time. The alternative embodiment shown in FIG. 13 can be readily adapted to cooperate with the circuitry and components within the slide projector in much the same manner as the FIGS. 1 through 12 embodiment.

While the invention has been shown in but only two forms, it will be obvious to those skilled in the art it is not to be so limited. On the contrary, the invention is susceptible of various forms and modifications without departing from the spirit and scope of the appended claims. In this respect, it will be understood that in lieu of the arrangement shown, the commutator strips or circular patterns of contacts could be driven at a 10:1 ratio with each other and the brushes associated with selector means. Further, other mechanical arrangements may be employed to establish the 10:1 driving ratio of one of the pairs of wheels on the shaft 44 during driving of the gear 41.

I claim:

1. In a slide projector having a rotatable slide tray with a plurality of slide receiving spaces, an electric motor for rotating the tray, the improved construction for rotating the tray to position any randomly selected space therein adjacent a slide transfer station, said construction comprising:
    (a) first control means including "units" contact means arranged in a circular pattern, a first contact, and means mounting the former and the latter for relative sweeping engagement with each other;
    (b) second control means including "tens" contact means arranged in a circular pattern, a second contact, and means mounting the former and the latter for relative sweeping engagement with each other;
    (c) a circuit for said motor, which circuit includes each of said contact means and said first and second contacts;
    (d) selector means connected with each of said control means for determining the arcuate extent of relative movement between the contact means and contact of each of said control means to establish a predetermined circuit condition, the establishment of said condition serving to de-energize said motor;
    (e) mechanical drive means for rotating the tray, such drive means being powered by said motor;
    (f) said drive means including mechanical elements connected to said first and second control means for causing relative rotation between the contact means and contact of the former at a 10:1 ratio with the contact means and contact of the latter simultaneously with rotation of said tray.

2. The improved construction according to claim 1 further defined by:
    (a) each of said contact means being in the form of a commutator strip having a cutout area;
    (b) each of said contacts being in the form of a brush in wiping engagement with the associated commutator strip;
    (c) said selector means including means for manually setting the arcuate spacing between each brush and the cutout area of the associated commutator strip;
    (d) said circuit condition being established by opening of said circuit, opening of the circuit occurring when both of said brushes lie in the cutout areas of respective commutator strips.

3. The improved construction according to claim 1 further defined by:
    (a) each of said contact means being in the form of a plurality of separate contact buttons;
    (b) said selector means including selectively actuated switch means for individually connecting in said circuit any contact button of each of said contact means;
    (c) said circuit condition being established by rotating said first and second contacts until each engages the associated contact button which is connected in said circuit.

4. The improved construction according to claim 1 wherein said mechanical elements include a Geneva drive.

5. In a slide projector having a rotatable slide tray with a plurality of slide receiving spaces numbered in sequence, indexing means for rotating the tray to locate successive spaces therein adjacent a slide transfer station, and disabling means for such indexing means, an attachment for rotating the tray to position any randomly selected space therein adjacent said station, said attachment comprising:
    (a) a housing detachably mountable on the shell of said projector;
    (b) said housing including a motor, a drive gear in meshing engagement with teeth on said tray, and drive means connected with said gear and powered by said motor;
    (c) first and second brushes mounted respectively on a first pair of wheels for movement in separate circular paths;
    (d) first and second circular commutator strips mounted respectively on a second pair of wheels in concentric relation therewith, each of which strips has a cutout area;
    (e) means mounting all of said wheels in parallel relation for rotation about a common axis with said first and second brushes in wiping engagement with first and second commutator strips, respectively;
    (f) said drive means including mechanical elements engaged with one pair of wheels for rotating such wheels at a 10:1 ratio with each other simultaneously with rotation of said drive gear;
    (g) a circuit in said housing connected with said motor, said brushes and said commutator strips, opening of said circuit serving to de-energize said motor, said circuit being open when both of said brushes lie in respective cutout areas;
    (h) "units" and "tens" indicia means associated with the other pair of wheels such that rotation of such wheels to establish the number of selected space in the tray causes relative positioning between said brushes and the associated strips for opening the circuit when the tray is rotated to locate the selected space adjacent the side transfer station.

6. Random selection means for a slide projector of the type having a slide changing station and a rotary slide tray with a plurality of slide receiving spaces for presenting slides one at a time to said station, said random selection means comprising:
    (a) drive means for rotating the tray;
    (b) an electric motor powering the drive means;
    (c) first control means including "units" contact means arranged in a circular pattern, a first contact, and means mounting the former and the latter for relative sweeping engagement with each other;
    (d) second control means including "tens" contact means arranged in a circular pattern, a second contact, and means mounting the former and the latter for relative sweeping engagement with each other;
    (e) a circuit including said motor, said first and second contacts and both of said contact means, which circuit is adapted to stop rotation of said tray upon the occurrenec of a predetermined circuit condition;
    (f) selector means associated with each of said control means to determine the extent of arcuate relative movement between each contact means and the associated contact to establish a predetermined contact condition, said circuit condition being established when said contact condition exists in each of said control means;
    (g) said drive means including mechanical means establishing relative rotation between the contact means and contact of the first control means at a 10:1 ratio with relative rotation between the contact means and contact of the second control means simultaneously with rotation of said tray;

(h) whereby said tray may be rotated for positioning, adjacent said slide changing station, any slide space selected at random by said selector means.

7. The random selection means according to claim 6 further defined by:
   (a) each of said contact means being in the form of a commutator strip having a cutout area;
   (b) each of said contacts being in the form of a brush in wiping engagement with the associated commutator strip;
   (c) said selector means including means for manually setting the arcuate spacing between each brush and the cutout area of the associated commutator strip;
   (d) said circuit condition being established by opening of said circuit, opening of the circuit occurring when both of said brushes lie in the cutout areas of respective commutator strips.

8. The random selection means according to claim 6 further defined by:
   (a) each of said contact means being in the form of a commutator strip having a cutout area;
   (b) each of said contacts being in the form of a brush in wiping engagement with the associated commutator strip;
   (c) said selector means including means for manually setting the arcuate spacing between each brush and the cutout area of the associated commutator strip;
   (d) said circuit condition being established by opening of said circuit, opening of the circuit occurring when both of said brushes lie in the cutout areas of respective commutator strips.

9. The random selection means according to claim 6 wherein said mechanical means include a Geneva drive.

10. In a slide projector having a rotatable slide tray with a plurality of slide receiving spaces numbered in sequence, drive means including an electric motor for rotating the tray to position said spaces one at a time adjacent a slide transfer station, an attachment for rotating the tray to position any randomly selected space therein adjacent said station, said attachment comprising a housing detachably mountable on the shell of said projector and including:
   (a) first and second brushes mounted respectively on a first pair of wheels for movement in separate circular paths;
   (b) first and second circular commutator strips mounted respectively on a second pair of wheels in concentric relation therewith, each of which strips has a cutout area;
   (c) means mounting all of said wheels in parallel relation for rotation about a common axis with said first and second brushes in wiping engagement with first and second commutator strips, respectively;
   (d) mechanical elements connected with said drive means and engaged with one of said pairs of wheels for rotating such wheels at a 10:1 ratio with each other simultaneously with rotation of said tray;
   (e) a circuit connected with said motor, said brushes and said commutator strips, opening of the circuit serving to de-energize said motor, said circuit being open when both of said brushes lie adjacent respective cutout areas;
   (f) "units" and "tens" indicia means associated with the other pair of wheels, such that rotation of such other wheels to establish the number of a selected space in the tray causes relative positioning between each brush and the associated strip for opening the circuit when the tray is rotated to locate the selected space adjacent the slide transfer station.

11. A random access attachment for a slide projector of the type having a slide transfer station, a rotary tray with a plurality of slide receiving spaces and an annular formation of indexing teeth, said attachment comprising:
   (a) a housing detachably mountable on the shell of the projector and including a drive gear for meshing engagement with said indexing teeth;
   (b) an electric motor in said housing for driving said gear;
   (c) manually operable selector means connected with said housing including at least two movable, numerical indicia bearing elements for establishing a number corresponding to the number of a selected space in the tray;
   (d) other means in said housing including a circuit connected to said motor and to said selector means and responsive to the positions of said elements for rotating the tray to locate the selected space adjacent said station.

12. The attachment according to claim 11 further defined by:
   (a) first and second pairs of wheels;
   (b) a pair of brushes mounted on respective wheels of one pair of wheels for movement in circular paths;
   (c) a pair of arcuate commutator strips mounted on respective wheels of the other pair of wheels in concentric relation therewith, each strip having a cutout area;
   (d) means mounting all of said wheels for rotation about a common axis with the brushes in respective wiping engagement with said strips, said brushes and said strips being connected in said circuit;
   (e) means driven by said motor for rotating the wheels of one of said pairs of wheels at a 10:1 ratio with each other;
   (f) said numerical indicia bearing elements being mounted on the other pair of wheels, the number of a selected slide being established by rotating such other pair of wheels;
   (g) said circuit being adapted such that location of the selected space adjacent said station occurs upon opening of the circuit, said circuit being open when both of said brushes lie in the cutout areas of the associated commutator strips.

13. Random access construction for a slide projector of the type having a slide transfer station, a rotary tray with a plurality of slide receiving spaces and an annular formation of indexing teeth, said construction comprising:
   (a) a drive gear for meshing engagement with said indexing teeth;
   (b) drive means including an electric motor and a first shaft driven thereby, which first shaft drives said gear;
   (c) a second shaft in parallel relation with said first shaft;
   (d) a first pair of wheels mounted for independent rotation on said second shaft and each carrying an electric brush for movement in a circular path;
   (e) a second pair of wheels mounted for independent rotation on said second shaft and each carrying an arcuate commutator strip in concentric relation therewith, each of said strips having a cutout area;
   (f) all of said wheels being arranged such that said brushes are in respective wiping engagement with said strips:
   (g) a pinion gear on said first shaft;
   (h) an annular formation of teeth on one wheel of one of said pairs of wheels, which teeth are engaged by said pinion gear thereby to drive said one wheel by said first shaft;
   (i) drive reducer means driven by said one wheel and engaged with the other wheel of said one pair of wheels for driving such other wheel at a 10:1 ratio with said one wheel;
   (j) numerical indicia means carried by said other pair of wheels for establishing a number corresponding to the number of a selected space in the tray;
   (k) a circuit including said motor, said brushes and said commutator strips, opening of the circuit serving to stop the tray with the selected space adjacent said station, said circuit being open when both of said brushes lie in the cutout areas of respective commutator strips.

14. The device according to claim 13 and being in the form of an attachment, said attachment including a housing detachably mounted on the shell of the projector and enclosing the structure recited in subdivisions (a) through (k).

References Cited

UNITED STATES PATENTS

| | | | |
|---|---|---|---|
| 3,146,667 | 9/1964 | Mulch | 353—25 |
| 3,225,652 | 12/1965 | Sauppe | 353—25 |
| 3,296,727 | 1/1967 | Liguori | 353—25 |

HARRY N. HAROIAN, Primary Examiner

U.S. Cl. X.R.

353—117